United States Patent Office 3,200,502
Patented Aug. 17, 1965

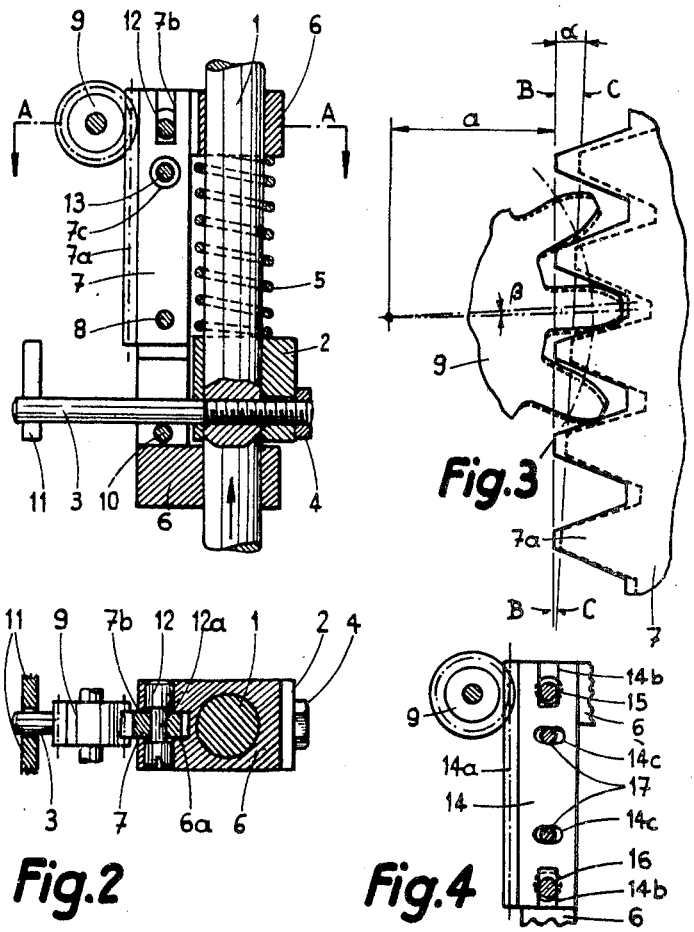

3,200,502
COMPARATOR
Hans Meyer, Le Bugnon 24, Renens, Vaud, Switzerland
Filed Feb. 11, 1964, Ser. No. 344,026
Claims priority, application Switzerland, May 30, 1963,
6,769/63
3 Claims. (Cl. 33—172)

In certain types of comparators, the movements of a feeler are transmitted to an indicator hand through the agency of a gearwork; to this end, the feeler is provided with a rectilinear series of teeth which extend along a line parallel with the axis of the feeler and cooperate with the first pinion of the gearwork.

The irregularities in the pitch of the rectilinear series of teeth and of the teeth carried by said first pinion are transmitted to the indicator hand and form thus a source of errors in the final result. To obtain pitches with suitably reduced allowances, it is necessary to machine the teeth on the feeler and the rack with the utmost accuracy. An increase in the accuracy of measurement implies therefore a very accurate machining of the teeth on the feeler and on the pinion, which can be obtained only through an increase in the price of manufacture and consequently in the price of the finished comparator.

My invention allows compensating simply for all errors in pitch, chiefly in those arising through defects in the rectilinear series of teeth. According to my invention, the rectilinear series of teeth may be angularly adjusted in a plane perpendicular to the axis of the first pinion of the gearwork with reference to the axis of the feeler, so as to provide means for modifying the transmission ratio during the operative movement of the rectilinear teeth, means being provided for locking the rectilinear series of teeth in the adjusted position assumed by it with reference to the feeler when the adjustment has been executed.

Thus, it is possible to resort to rectilinear series of teeth showing slight irregularities in pitch in high grade comparators, which obviously has for its result to make them cheaper.

The corrections provided by my invention do not relate exclusively to irregularities in the rectilinear series of teeth, and they allow also compensating to a certain extent for errors arising in other parts of the gearwork, as a consequence for instance of a possible eccentricity of the gearwheels.

I have illustrated, by way of example, in the accompanying drawings, a preferred embodiment of my improved comparator. In said figures:

FIGURE 1 is a partly cross-sectional elevational view of the comparator.

FIGURE 2 is a cross-section through line A—A of FIGURE 1.

FIGURE 3 is a partial view on a larger scale of the cooperating series of teeth in the comparator according to FIGURE 1.

FIGURE 4 illustrates a modification of the comparator according to FIGURE 1.

FIGURES 1 and 2 show a part of a feeler 1 standing in its lower inoperative position, said feeler moving axially during measurements in the direction of the arrow. A carrier member 2 may be secured to the feeler 1 through the agency of a transversely extending threaded rod 3 and of a nut 4.

A U-shaped member 6 facing the feeler and urged upwardly by a spring 5 is slidably fitted over the feeler 1. It is adapted to engage the underside of the threaded rod 3 through the agency of a pin 10 extending across the U-shaped member 6. Said arrangement has for its object to absorb shocks. As a matter of fact, if an upwardly directed shock is applied to the feeler 1, said shock is first absorbed by the spring 5 before it is transmitted to the U-shaped member 6 which provides thus a protection of the gearwork cooperating with the U-shaped member.

Any pivotal movement of the feeler round its axis is prevented by reason of the threaded rod 3 being constrained to move along vertical guiding means 11 carried inside the casing of the comparator, which casing is not illustrated.

The U-shaped member is provided with a groove 6a (FIGURE 2) housing a rack 7. The latter is secured by two screws 8 and 13 to the U-shaped member 6 in a manner such that the rack engages the screw 8 without any clearance, while the hole 7c in the rack shows a slight clearance with reference to the cooperating other screw 13. This allows said rack 7 to pivot slightly round the screw 8 within the range allowed by the clearance between the hole 7c and the screw 13.

The member adjusting the angular setting of rack 7 with reference to the screw 8 is constituted by a pin 12 fitted across the U-shaped member 6 and the central section of which forms an eccentric part 12a. The latter engages a slit 7b formed in the rack 7 so that the latter may be shifted angularly into a slightly sloping position with reference to the longitudinal axis of the feeler upon rotation of the pin 12.

The rack 7 is provided with a rectilinear series of teeth 7a in the shape of an involute, providing an angle of engagement equal to say 20°. Said series of teeth cooperates with the teeth of a pinion 9, which latter is carried in a conventional manner inside the comparator casing. The cooperating teeth on the rack and on the pinion are illustrated on a larger scale in FIGURE 3. Normally, the path BB of the rectilinear series of teeth 7a is parallel with the axis of the feeler and is located at a distance $a$ from the axis of the pinion 9. If it is found, when checking the comparator, that the indications given by it are too low when the feeler is in its lowermost position, while the value indicated is accurate when the latter is in its uppermost position, it is possible to correct such an error by giving a slope to the rack 7 as illustrated by the line CC of FIGURE 3. Said slope $\alpha$ given to the rack 7a has for its result to correct the angle of engagement with the pinion by an angle $\beta$ at the upper end of the rack. Said slope has, in contradistinction, no influence at the lower end of the rack. In practice, said correction is very small. In FIGURE 3, it has been considerably enlarged, so as to make my invention more readily understandable.

FIGURE 4 illustrates a modification of FIGURE 1, wherein the rack 14 fitted on the U-shaped member 6 is provided with a short longitudinal slot 14b at each end. Eccentric members 15 and 16 fitted on the U-shaped member 6 cooperate with said grooves to allow the rack to assume an adjustable predetermined slope with reference to the axis of the feeler. By simultaneous action on the eccentric members 15 and 16, it is also possible to shift the rack 14 in parallelism with the longitudinal axis of the feeler with a view to adjusting the clearance between the rectilinear series of teeth 14a and the teeth on the pinion 9. With screws 17, passing slots 14c in the rack 14, the latter may be secured in the adjusted position. Thus, the spacing between the axis of the pinion and the path followed by the apices of the rectilinear series of teeth is less critical, which allows reducing again the cost price of the comparator.

I claim:

1. In a comparator, the combination of a feeler adapted to be shifted along the direction of its axis, a rack pivotally secured to the feeler and provided with a short longitudinal slot at a distance from its pivotal connection with the feeler and with a rectilinear series of teeth extending longitudinally of the feeler, a gearwork including a pinion meshing with said rectilinear series of teeth, a hand controlled by said gearwork, and a rotary hand-controlled member carried by the feeler and including an eccentric section engaging the slot in the rack to shift adjustably to a slight extent the rack with reference to the feeler axis in a plane perpendicular to the axis of the pinion and passing through the feeler axis to set the rectilinear series of teeth in position within an angle bounded by a line parallel with the axis of the feeler and also slightly oblique with reference to said axis and passing through the pivotal connection between the rack and the feeler.

2. In a comparator, the combination of a feeler adapted to be shifted along the direction of its axis, a rack provided at each end with a short longitudinal slot and provided with a rectilinear series of teeth extending longitudinally of the feeler, a gearwork including a pinion meshing with said rectilinear series of teeth, a hand controlled by said gearwork, and eccentric members revolvably carried by the feeler and engaging the longitudinal slots in the rack, the angular shifting of the eccentric members engaging the transverse slots being adapted to shift slightly the rack into an angularly and/or transversely adjusted position with reference to the feeler.

3. In a comparator, the combination of a feeler adapted to be shifted along the direction of its axis, a support elastically carrying the feeler, a member shiftably secured to said support and provided with a rectilinear series of teeth extending longitudinally of the feeler, a gearwork including a pinion meshing with said rectilinear series of teeth, a hand controlled by said gearwork, and means for shifting slightly and adjustably the member provided with the rectilinear series of teeth with reference to the feeler axis in a plane perpendicular to the axis of the pinion and passing through the feeler axis to adjust the position of said rectilinear series of teeth within an angle bounded by a line parallel with the axis of the feeler and a line slightly oblique with reference to said axis.

References Cited by the Examiner

UNITED STATES PATENTS

| | | | |
|---|---|---|---|
| 1,334,999 | 3/20 | Haley | 33—172 |
| 2,476,713 | 7/49 | Emery | 33—172 |
| 2,548,603 | 4/51 | Hallstrand | 74—409 |
| 2,563,402 | 8/51 | Emery | 33—172 |
| 2,741,032 | 4/56 | Emery | 33—172 |
| 2,835,980 | 5/58 | Rose | 33—172 |
| 2,977,685 | 4/61 | Biro | 33—172 |

ISAAC LISANN, *Primary Examiner.*